US012574321B2

(12) United States Patent
Bisht et al.

(10) Patent No.: US 12,574,321 B2
(45) Date of Patent: Mar. 10, 2026

(54) SYSTEM AND METHOD FOR FACILITATING ROUTING OF LEVEL 1 NUMBERS

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Nitin Ashok Warape, Navi Mumbai (IN); Abhay Kumar, Dombivli East (IN); Suman Naskar, Dombivli East (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 411 days.

(21) Appl. No.: 18/247,440

(22) PCT Filed: Mar. 24, 2023

(86) PCT No.: PCT/IB2023/052912
§ 371 (c)(1),
(2) Date: Mar. 30, 2023

(87) PCT Pub. No.: WO2023/187565
PCT Pub. Date: Oct. 5, 2023

(65) Prior Publication Data
US 2024/0364626 A1      Oct. 31, 2024

(30) Foreign Application Priority Data
Mar. 30, 2022    (IN) .............................. 202221018955

(51) Int. Cl.
*H04L 45/60* (2022.01)
*H04L 45/74* (2022.01)
(Continued)

(52) U.S. Cl.
CPC ............ *H04L 45/60* (2013.01); *H04L 45/742* (2013.01); *H04L 65/1063* (2013.01); *H04L 65/1108* (2022.05); *H04W 40/02* (2013.01)

(58) Field of Classification Search
None
See application file for complete search history.

(56) References Cited

U.S. PATENT DOCUMENTS

| | | | | |
|---|---|---|---|---|
| 9,602,556 B1 * | 3/2017 | Cham | .................... | H04L 67/565 |
| 2003/0063714 A1 * | 4/2003 | Stumer | .................. | H04M 11/04 |
| | | | | 379/37 |
| 2007/0060097 A1 * | 3/2007 | Edge | .................... | H04L 69/164 |
| | | | | 455/404.1 |
| 2009/0028070 A1 | 1/2009 | Matsuo et al. | | |

(Continued)

FOREIGN PATENT DOCUMENTS

| | | |
|---|---|---|
| JP | 2013031170 A | 2/2013 |
| WO | 2007125698 A1 | 11/2007 |
| WO | 2020046962 A1 | 3/2020 |

OTHER PUBLICATIONS

International Search Report and Witten Opinion issued by the International Searching Authority issued in related Foreign Application No. PCT/IB2023/052912, mailed Jul. 20, 2023 (7 pgs.).

*Primary Examiner* — Otis L Thompson, Jr.
(74) *Attorney, Agent, or Firm* — FINNEGAN, HENDERSON, FARABOW, GARRETT & DUNNER, LLP

(57) ABSTRACT
The present disclosure relates to a system (100) and method to facilitate accurate routing of level one (L1) numbers dialed by a user irrespective of the location of the user. The system may include a converge telephony application server (CTAS) (102), associated with a predefined circle, a centralized database accessible by the at least one CTAS (102), a centralized data layer (CDL) server (104) maintaining a mapping table comprising L1 routing information between an ECI and SDCA of the predefined circle. The CTAS may (102) receive one or more predefined request signals from
(Continued)

one or more UE (110) by dialling an L1 number based on which the CTAS (102) may generate, a routing control signal for routing the UE (110) communication to a target site or for supplying one or more corresponding handling strategies to the target site.

26 Claims, 8 Drawing Sheets

(51) Int. Cl.
    *H04L 65/1063*    (2022.01)
    *H04L 65/1108*    (2022.01)
    *H04W 40/02*    (2009.01)

(56)          References Cited

U.S. PATENT DOCUMENTS

| | | | |
|---|---|---|---|
| 2010/0316159 A1 | 12/2010 | Bo et al. | |
| 2011/0026440 A1* | 2/2011 | Dunn | H04M 3/5116 |
| | | | 370/259 |
| 2012/0290871 A1* | 11/2012 | Le Rouzic | H04L 65/1016 |
| | | | 714/E11.073 |
| 2013/0225112 A1* | 8/2013 | Frey | H04L 67/55 |
| | | | 455/404.1 |
| 2015/0098394 A1* | 4/2015 | Corcoran | H04W 88/16 |
| | | | 370/329 |
| 2015/0229536 A1* | 8/2015 | Coadic | H04L 67/51 |
| | | | 709/223 |
| 2016/0142447 A1* | 5/2016 | Mufti | H04L 65/1016 |
| | | | 370/259 |
| 2020/0076730 A1 | 3/2020 | Comeras et al. | |

* cited by examiner

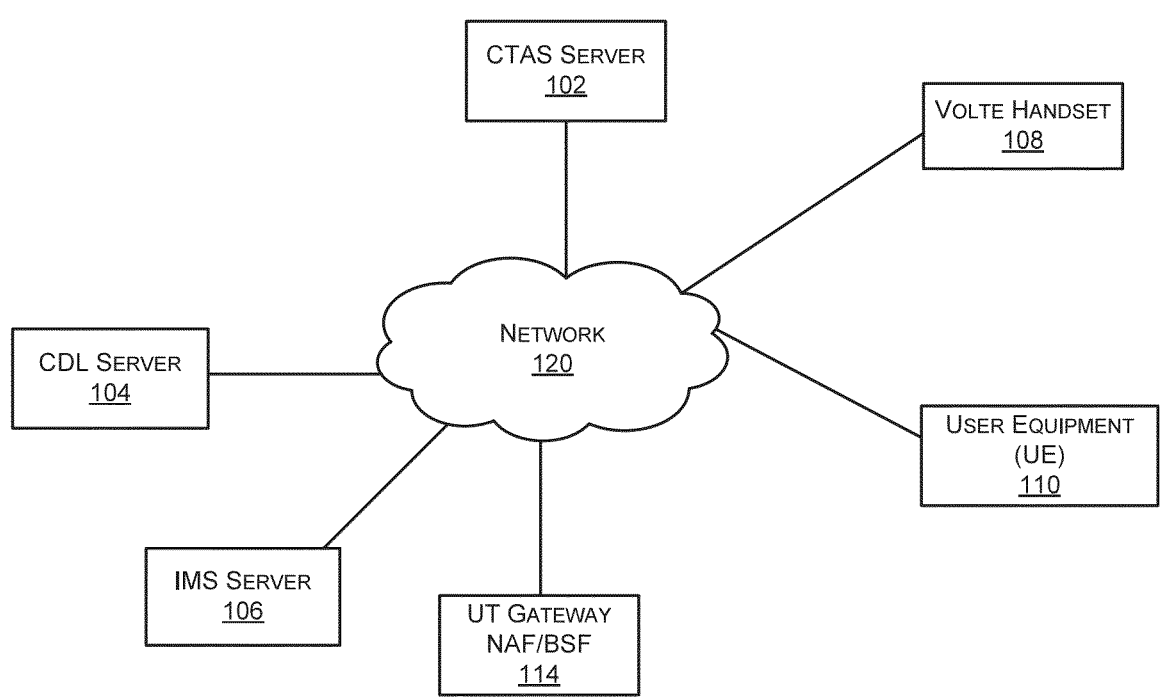
FIG. 1A

200

208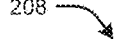
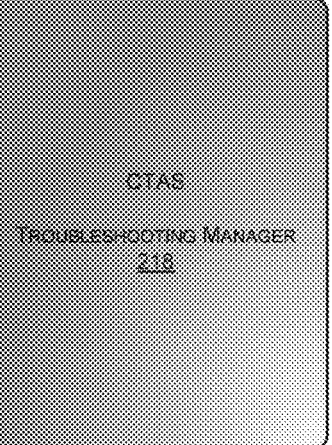
CTAS
SESSION MANAGER
214
CTAS
OAM MANAGER
216
CTAS
TROUBLESHOOTING MANAGER
218
FIG. 2B

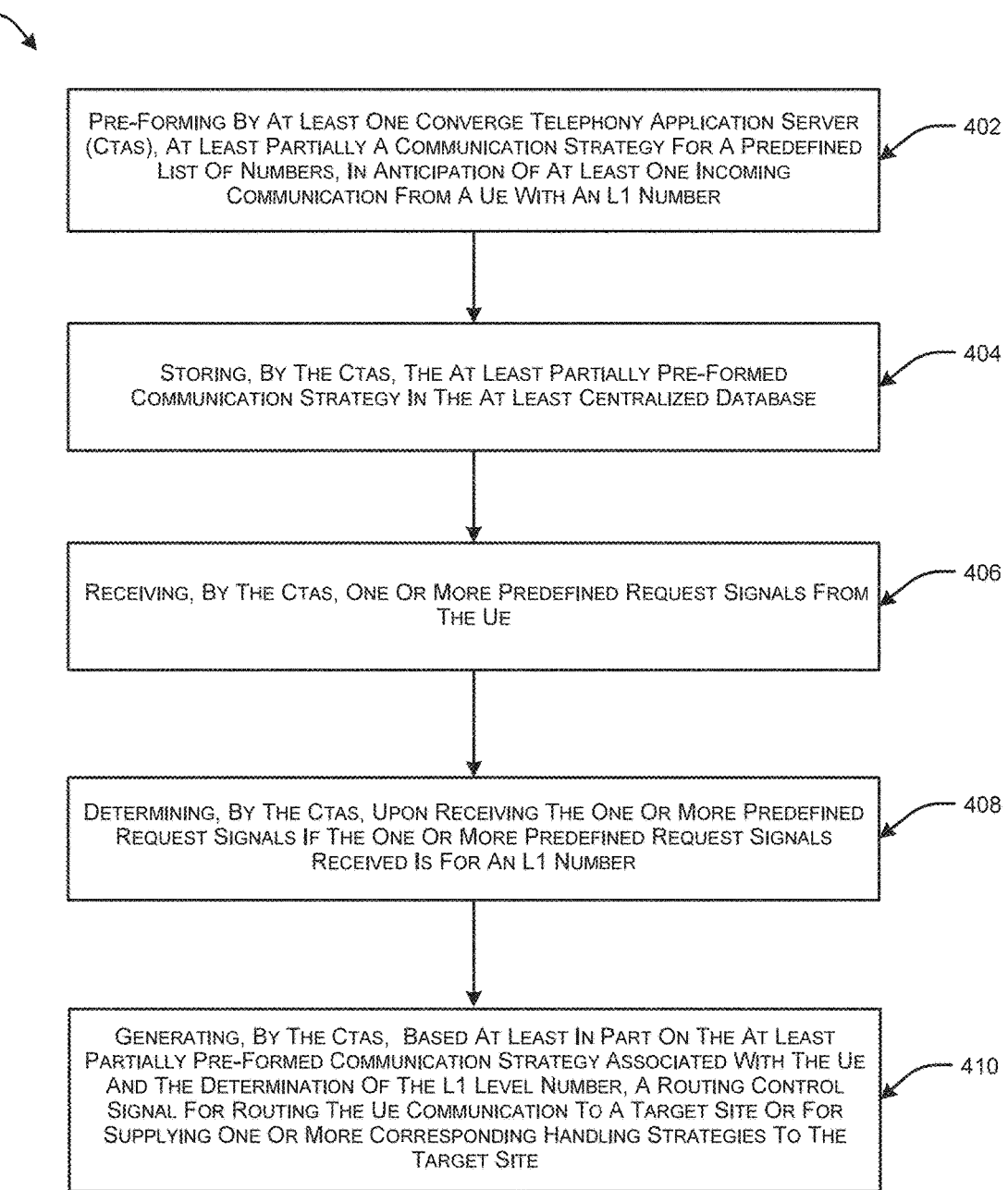

400

PRE-FORMING BY AT LEAST ONE CONVERGE TELEPHONY APPLICATION SERVER (CTAS), AT LEAST PARTIALLY A COMMUNICATION STRATEGY FOR A PREDEFINED LIST OF NUMBERS, IN ANTICIPATION OF AT LEAST ONE INCOMING COMMUNICATION FROM A UE WITH AN L1 NUMBER — 402

STORING, BY THE CTAS, THE AT LEAST PARTIALLY PRE-FORMED COMMUNICATION STRATEGY IN THE AT LEAST CENTRALIZED DATABASE — 404

RECEIVING, BY THE CTAS, ONE OR MORE PREDEFINED REQUEST SIGNALS FROM THE UE — 406

DETERMINING, BY THE CTAS, UPON RECEIVING THE ONE OR MORE PREDEFINED REQUEST SIGNALS IF THE ONE OR MORE PREDEFINED REQUEST SIGNALS RECEIVED IS FOR AN L1 NUMBER — 408

GENERATING, BY THE CTAS, BASED AT LEAST IN PART ON THE AT LEAST PARTIALLY PRE-FORMED COMMUNICATION STRATEGY ASSOCIATED WITH THE UE AND THE DETERMINATION OF THE L1 LEVEL NUMBER, A ROUTING CONTROL SIGNAL FOR ROUTING THE UE COMMUNICATION TO A TARGET SITE OR FOR SUPPLYING ONE OR MORE CORRESPONDING HANDLING STRATEGIES TO THE TARGET SITE — 410

FIG. 4

SYSTEM AND METHOD FOR FACILITATING ROUTING OF LEVEL 1 NUMBERS

FIELD OF INVENTION

The present invention relates generally to network devices, and more particularly to next generation network devices to enable routing of a plurality of level one numbers to respective services.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Call routing is a call management feature that automatically distributes incoming calls according to criteria based on the routing tables pre-configured at routing node. In Indian telecom network, Level-1 (L1) numbers are used for specialised services. Level 1 numbers include for services such as, for example, healthcare, fire rescue services, ambulance, other rescue operations, police assistance, and other such entities. For example, helpline numbers have been created such as 139 for Railway Helpline, 181 for Woman in distress, 1094 for Missing children and women, 1096 for Crime against women and the like have been created by different states in India.

In the current scenario, when a subscriber dials any of these helpline numbers, network is required to route these numbers to one or more BSNL/MTNL exchanges in the same Short-Distance Charging Area (SDCA). For some helpline numbers SDCA is required to be pre-fixed for routing. The level-1 number routing at present is based on PANI and is taken care of by Serving-Call Session Control Function (SCSCF) node in the IMS responsible for session control. Subscribers will be allocated the S-CSCF for the duration of their IMS registration in order to facilitate routing of SIP messages as part of service establishment procedures. However, problem arises when L1 calls are made when a user is in roaming. For example, when the user device of the user is turned on or is transferred via a handover to a new network, in VOLTE/IMS user device is always registered to its home network and all calls dialled from user device will first land to the home network and thereafter home network will route call to the final destination. In case of Level-1 routing (where calls are routed based on user device current location), S-CSCF or any other network node will have to maintain all the list of entire country all circle such as PAN India cell-IDs (i.e. PANI) as user device can roam to any part of India. Thus, the routing of L1 numbers take lot of resource in term processing power, time, storage and operation overhead due to processing of huge volume of data of PAN India cell-ID. The SCSCF may take sufficient amount of time to search in the database for the correct routing information.

There is, therefore, a requirement in the art for an effective and economical system and method that can overcome aforementioned problems in the art and can effectively enable a faster, and next generation-based service for facilitating routing of L1 numbers.

OBJECTS OF THE PRESENT DISCLOSURE

Some of the objects of the present disclosure, which at least one embodiment herein satisfies are as listed herein below.

It is an object of the present disclosure to facilitate an effective, concurrent and improved communication with a plurality of L1 numbers.

It is an object of the present disclosure to eliminate the delays while getting access to a service while in roaming.

It is an object of the present disclosure to facilitate an economical and next generation-based system and a method that can avoid the need for individually contacting each emergency service, thus avoiding unnecessary delay.

It is an object of the present disclosure to facilitate a system and a method that can enable an instant communication with multiple emergency service contacts irrespective of the location of the user.

It is an object of the present disclosure to facilitate optimized use of a centralised database associated with the network.

It is an object of the present invention to efficiently establish the call connection.

SUMMARY

This section is provided to introduce certain objects and aspects of the present invention in a simplified form that are further described below in the detailed description. This summary is not intended to identify the key features or the scope of the claimed subject matter.

In an aspect, a communication system for routing and handling level 1 (L1) numbers is provided in this disclosure. The communication system may include at least one converge telephony application server (CTAS) associated with a predefined circle, a centralised database accessible by the at least one CTAS, wherein the centralized database may maintain a mapping table comprising L1 routing information between an E-UTRAN Cell Identifier (ECI) and a Short Distance Charging Area (SDCA) of the predefined circle. The CTAS may be configured to pre-form at least partially a communication strategy for a predefined list of numbers, in anticipation of at least one incoming communication from a UE with an L1 number. The UE may be associated with the predefined circle in a communication network. In an embodiment, the at least partially pre-formed communication strategy comprising any or a combination of routing strategy and a handling strategy determined based on the mapping table comprising L1 number routing information between the ECI and the SDCA of the predefined circle. Furthermore, the CTAS may determine upon receiving the one or more predefined request signals if the one or more predefined request signals received is for an L1 number and then generate, based at least in part on the at least partially pre-formed communication strategy associated with the UE and the determination of the L1 level number, a routing control signal for routing the UE communication to a target site or for supplying one or more corresponding handling strategies to the target site.

In an aspect, a method is proposed for routing and handling level 1 (L1) numbers. The method may include a step of pre-forming by at least one converge telephony application server (CTAS), at least partially a communication strategy for a predefined list of numbers, in anticipation of at least one incoming communication from a UE with an L1 number. In an embodiment, the at least partially pre-formed communication strategy comprising any or a combination of routing strategy and a handling strategy determined based on the mapping table comprising L1 number routing information between an E-UTRAN Cell Identifier (ECI) and a Short Distance Charging Area (SDCA) of the predefined circle. In an embodiment, the at least one CTAS may be associated with a predefined circle may access at least one centralised database, said centralized database maintaining a mapping table comprising L1 routing information between the ECI and the SDCA of the predefined circle, and the routing strategy and handling strategy may occur through one or more communication interfaces for communicating with a plurality of UEs via one or more channels selected from a group consisting of: telephonic calls, web-based communications, voice-over-IP communications, and real-time text interactions. In an embodiment, the plurality of UEs may be associated with the predefined circle in a communication network. The method may include a step of receiving one or more predefined request signals from the UE by the CTAS. The method may include a step of determining, by the CTAS, upon receiving the one or more predefined request signals if the one or more predefined request signals received is for an L1 number. Furthermore, the method may include a step of generating based on at least in part on the at least partially pre-formed communication strategy associated with the UE and the determination of the L1 level number, a routing control signal for routing the UE communication to a target site or for supplying one or more corresponding handling strategies to the target site by the CTAS.

In an embodiment, the at least one incoming communication may be selected from a group consisting of telephonic calls, web-based communications, voice-over-IP communications, and real-time text interactions.

In an embodiment, the CTAS may be configured to store the at least partially pre-formed communication strategy in the centralized database, wherein the centralised database may be accessible by the at least one CTAS (102), and may maintain a mapping table comprising L1 routing information between the (ECI) and the SDCA of the predefined circle.

In an embodiment, one or more communication interfaces for communicating with the plurality of UEs (110) via one or more channels may be selected from a group consisting of: telephonic calls, web-based communications, voice-over-IP communications, and real-time text interactions.

In an embodiment, the one or more predefined request may indicate a requirement to establish the routing of L1 level numbers from the UE to the plurality of services associated with the L1 numbers at the pre-defined location. The at least one CTAS may identify a pre-defined identification data of the UE at the pre-defined location, and further identify the pre-defined identification data of the UE at the pre-defined location based on the pre-defined location of the UE and the predefined identification data selected from a group consisting of a phone number, an IP address, a device identifier, a user identifier, a cell identifier (cell-id), a pre-visited network id (PVNI), Pseudo Automatic Number Identification (PANI) and a program identifier.

In an embodiment, the at least one CTAS may be further configured to treat each L1 number based on the pre-defined identification data and a predefined set of configuration parameters.

In an embodiment, the at least one CTAS may be further configured to allow routing information of a default circle to take precedence when configuration of a L1 number may be missing under the predefined identification data.

In an embodiment, the one or more predefined request may be initiated by a user associated with the UE by dialling an L1 number using a dialling pad of the UE (110).

In an embodiment, prior to routing of the one or more predefined request to the UE, the CTAS may evaluate a pre-defined location of the UE associated with the pre-defined circle at the time of initiation of the one or more predefined request, wherein the predefined circle may be either a home circle, a current visited circle or a roaming circle.

In an embodiment, the at least partially pre-formed communication strategy associated with the UE may include checking by the CTAS, the PVNI and the PANI of the UE to ascertain a predefined location associated with a current visited circle of the user and a cell-id to which the UE is currently latched into.

In an embodiment, the at least partially pre-formed communication strategy associated with the UE may include rejecting an incoming call from a UE, if any or a combination of dialling of an L1 number is not allowed from a current visited circle and the routing information for the PVNI of the UE is not present in the CTAS for the current visited circle.

In an embodiment, the at least partially pre-formed communication strategy associated with the UE may include querying a centralized data layer (CDL) server (104) by the CTAS to provide mapping of a SDCA against a cell-id retrieved from a PANI header associated with a UE dialling a L1 number, wherein the centralized data layer (CDL) server (104) is operatively coupled to the centralized database.

In an embodiment, the at least partially pre-formed communication strategy associated with the UE may include mapping of the cell-id with the SDCA for the predefined circle by the CDL, wherein if the UE is in roaming mode in a roaming circle, the CDL is further configured to query the centralized database to determine the mapping details of the UE in the roaming circle and transmit the mapping details to the CTAS.

In an embodiment, the cell ID associated with the UE may include of an enodeB ID, wherein a location-based routing information of the UE can be maintained using the enodeB-ID to reduce a data storage requirement by at least ⅛.

In an embodiment, the CDL server may cache a home circle location-based routing data of the UE after reading from the centralized database during start-up, wherein the home circle location based routing data of the UE may be cached in a storage unit operatively coupled to the CDL server.

In an embodiment, the CDL server may not query the centralized database for the UE that is in the home circle location, and wherein the CDL may query the centralized database for the UE in the roaming circle.

In an embodiment, the CTAS may convert the dialled L1 number to a predefined number format associated with the SCDA.

In an embodiment, the at least partially pre-formed communication strategy associated with the UE may include skipping of the query to the CDL server by the CTAS if for an L1 number a predetermined routing is not required based on the PANI header, wherein an outgoing uniform resource identifier (URI) for a UE associated with the L1 number may be created based on a requirement configuration associated with an entity.

In an aspect, a user equipment (UE) is provided that is communicatively coupled with at least one converge telephony application server (CTAS). The CTAS coupling may include steps of receiving a dialling of a Level 1 number request from the UE, sending an acknowledgment of the dialling of the Level 1 number request to the CTAS and transmitting a plurality of signals in response to the dialling of a Level 1 number request.

In an aspect, a non-transitory computer readable medium comprising machine executable instructions that are executable by a processor is provided. The processor is configured to: pre-form at least partially a communication strategy for a predefined list of numbers, in anticipation of at least one incoming communication from a UE with an L1 number, wherein the at least partially pre-formed communication strategy may include any or a combination of routing strategy and a handling strategy determined based on the mapping table comprising L1 number routing information between an E-UTRAN Cell Identifier (ECI) and a Short Distance Charging Area (SDCA) of the predefined circle. The processor may be further configured to receive one or more predefined request signals from the UE, determine upon receiving the one or more predefined request signals whether the one or more predefined request signals received is for an L1 number; and generate, based on the at least partially pre-formed communication strategy associated with the UE and the determination of whether the one or more predefined request signals received is for the L1 level number, a routing control signal for performing any or a combination of routing the UE communication to a target site and supplying one or more corresponding handling strategies to the target site.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIGS. 1A-1B illustrate exemplary network architecture in which or with which system of the present disclosure can be implemented, in accordance with an embodiment of the present disclosure.

FIGS. 2A-2B with reference to FIG. 1A, illustrate an exemplary representation of a network device, in accordance with an embodiment of the present disclosure.

FIG. 4 illustrates an exemplary representation of a method flow diagram, in accordance with embodiments of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The present system and method facilitate to overcome the above-mentioned problems by enabling establishment of an effective routing of level 1 numbers to respective target services irrespective of the location of the user. The system and method can provide accurate routing of the level 1 numbers even if a user is not within his respective circle but is accessing a visited network in a different circle. For example, if a Mumbai-based user visits Delhi and dials a Level 1 number, the disclosed system and method can accurately, without any delay route the level 1 number to its respective target service.

Figure 1B:
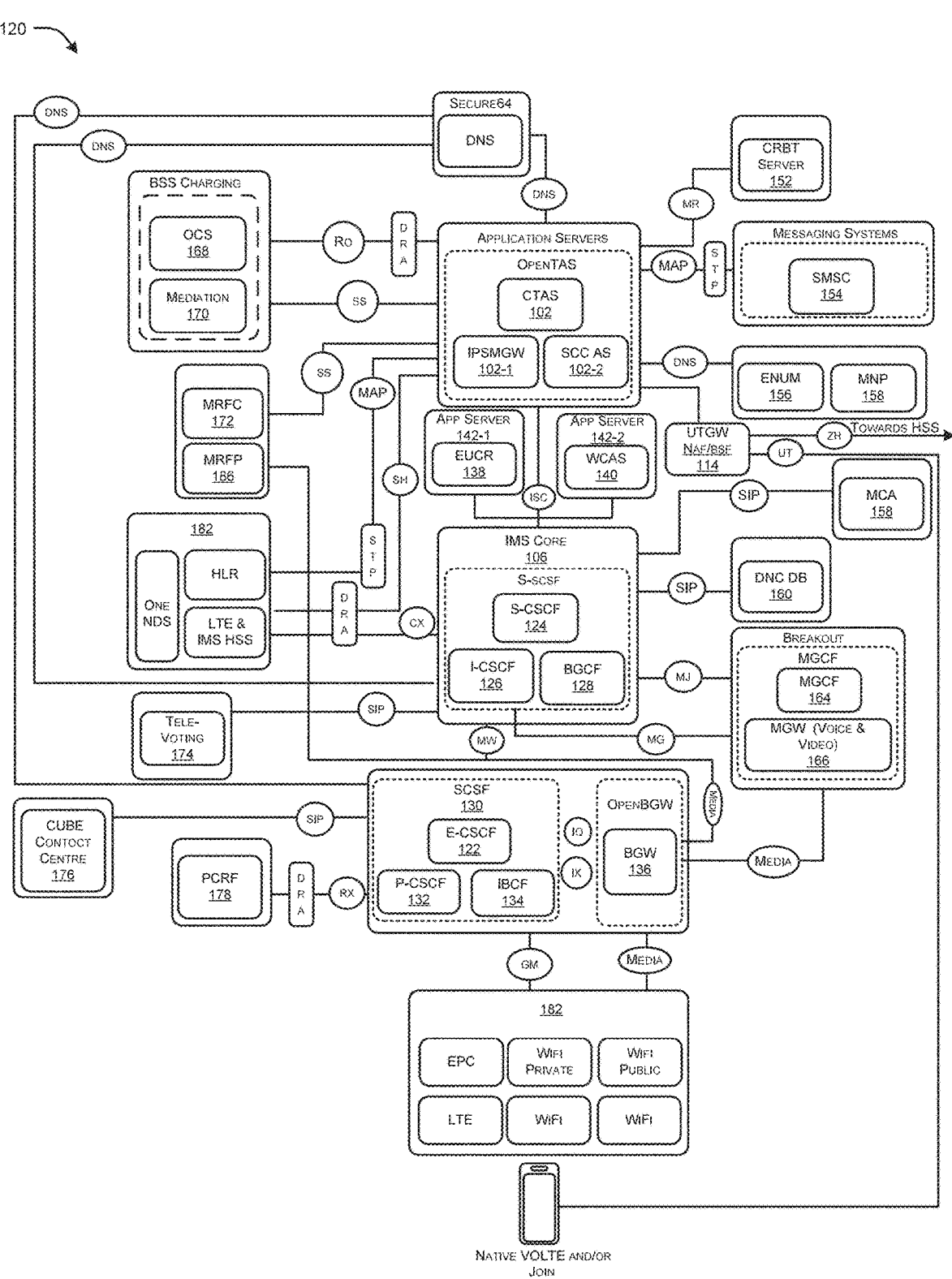

FIGS. 1A-1B illustrate exemplary network architecture 100 and 120 in which or with which system of the present disclosure can be implemented, in accordance with an embodiment of the present disclosure. As illustrated in representation 100 in FIG. 1A, a network device 102 (network device hereinafter interchangeably referred to as converge telephony application server or CTAS 102) may be configured to facilitate a user device 110 to route a predefined level 1 number to a predefined service. The network device 102 may be configured as an application server and may be communicably operational or may be integrated with the Internet Protocol Multimedia Subsystem (IMS) server 106 (also interchangeably referred to as IMS or IMS core). The IMS server 106 may pertain to a vendor or service provider to enable a user device 110 to establish simultaneous communication with plurality of emergency services. In an embodiment, the CTAS or the network device 102 may be implemented in an existing IMS implementation to facilitate network service corresponding to communication network 112. In an example, the communication network 112 may pertain to, for example, fifth generation (5G) network service.

The user device 110 (also interchangeably referred to as a user equipment or UE or terminal 110) may be at least one of a wireline device or wireless device. For example, the wireline device may be a landline phone, a terminal device or any other stationary device through which communication may be established. The wireless device may be a mobile device that may include, for example, cellular telephone, such as a feature phone or smartphone and other devices. The user device may not be limited to the abovementioned devices, but may include any type of device capable of wireline or wireless communication, such as a cellular phone, a tablet computer, a personal digital assistant (PDA), a personal computer (PC), a laptop computer, a media centre, a workstation and other such devices.

In an embodiment, the communication network 112 pertaining to CTAS based IMS implementation may be a 5G network that may include at least one of a wireless network, a wired network or a combination thereof. The communication network 112 may be implemented as one of the different types of networks, such as Intranet, Local Area Network (LAN), Wide Area Network (WAN), Internet, and the like. Further, the network can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), Automatic repeat request (ARQ), and the like. In an embodiment, the communication network 112 may pertain to a 5G network that may be facilitated through, for example, Global System for Mobile communication (GSM) network; a universal terrestrial radio network (UTRAN), an Enhanced Data rates for GSM Evolution (EDGE) radio access network (GERAN), an evolved universal terrestrial radio access network (E-UTRAN), a WIFI or other LAN access network, or a satellite or terrestrial wide-area access network such as a wireless microwave access (WIMAX) network. In an example embodiment, the communication network may correspond to a 5G or a 6G network based on subscription pertaining to the user/user device and/or through a Subscriber Identity Module (SIM) card. Various other types of communication network or service may be possible.

In an example, the communication network 112 may utilize different sort of air interface, such as a code division multiple access (CDMA), time division multiple access (TDMA), or frequency division multiple access (FDMA) air interface and other implementation. In an example embodiment, the wireline user device may use wired access networks, exclusively or in combination with wireless access networks, for example, including Plain Old Telephone Service (POTS), Public Switched Telephone Network (PSTN), Asynchronous Transfer Mode (ATM), and other network technologies configured to transport Internet Protocol (IP) packets.

As shown in FIG. 1B, in an example, the CTAS (102) may be session initiation application (SIP) server that is a 3GPP and RFC compliant implementation of LTE service architecture. The CTAS at the centre of a voice core network (150), managing the connectivity between subscribers and the implementation of supplementary services. An Ro interface based online charging (168) may be implemented in the telecom network. One or more charging data records (CDRs) generated by application servers, such as CTAS, can be used by a Mediation system (170) for reconciliation purpose. The CTAS (102) may further be operatively coupled to a call forwarding vertex (CFX) (122) that controls every service in an all-IP network and makes possible new subscriber services such as VoLTE, VoWiFi, RCS and WebRTC. For example, the CFX can act as a central control coreand offers session and service control, using predefined interfaces and application triggering mechanisms. One or more access elements and clients such as VoLTE Devices and operator 4G Voice Client (166) may be further associated with the CTAS (102). In an example, The CTAS (102) may be further coupled to an Element Management System (EMS) that can manage specific types of one or more network elements (172, 174, 176) within a telecommunication management network (TMN). A Centralised Data Layer (CDL) (104) may further be operatively coupled to the CTAS (102).

In an example, the CDL can maintain a mapping table between an ECI and Short-Distance Charging Area (SDCA) of a circle. During application commissioning process, the CDL instance of the circle (MNC) will download cell-id vs SDCA mapping table of the circle (MNC) from the centralized database. In an example, a UtGW (NAF and BSF) (114) provides a gateway to one or more networks for providing application-independent functions for mutual authentication of a user equipment and servers unknown to each other and for 'bootstrapping' the exchange of secret session keys afterwards. This allows the use of additional services like Mobile TV and PKI, which need authentication and secured communication. For example, the BSF is introduced by the application server (NAF), after an unknown UE device is trying to get service access: the NAF refers the UE to the BSF. UE and BSF mutually authenticate via 3GPP protocol AKA (Authentication and Key Agreement); additionally, the BSF sends related queries to the Home Subscriber Server (HSS). Afterwards, UE and BSF agree on a session key to be used for encrypted data exchange with the application server (NAF). When the UE again connects to the NAF, the NAF is able to obtain the session key as well as user-specific data from the BSF and can start data exchange with the end device (UE), using the related session keys for encryption.

The IMS server (106 of FIG. 1A and FIG. 1B) may include one or more modules or components that may enable to perform one or more functions. For example, the IMS server may be an existing IMS core including components/modules handling various functions such as, serving-call session control function (S-CSCF) module 124, interrogating call session control function (I-CSCF) module 126, proxy-call session control function (P-CSCF) module 132. In an embodiment, the CTAS 102 may be integrated with a network of the IMS core and other application servers to provide a network service such as for example, a fifth generation (5G) network and may include a telephony application server (TAS), which may be considered as a general component used in a communication network to provide telephony applications and additional multimedia functions. In another example, the other application server may include Mobile number portability (MNP) server 158, which may provide number portability to users such as, for example, may allow retaining same number upon change in service provider. In an yet another example, another application server may include a Short Message Service Center (SMSC) (154) that may store, forward, convert and deliver Short Message Service (SMS) messages. Various other servers may be integrated to the CTAS enabled IMS implementation for enabling one or more services pertaining to communication network or 5G network.

In an embodiment, the network device or CTAS 102 may be communicably coupled or be integrated with one or more functional components such as, for example, a session initiation protocol (SIP) based application server.

Further, as shown in FIG. 1B, to provide various aspects of the network service (such as 5G network), the components of IMS server (such as S-CSCF, I-CSCF module) may also include components/modules that pertain to functions, for example, breakout gateway control function (BGCF) module 128, a media gateway control function (MGCF) module 164, interconnect border control function (IBCF) 134 and other components/modules. In general implementation, the BGCF module 128 may enable routing call signalling to and from the most appropriate S-CSCF module 124. In the present implementation, the BGCF module 128 may enable to route the call to respective CTAS 102 for establishing routing of L1 numbers. The CFX module (122) may further include an Emergency-Call Session Control Function (130). The E-CSCF (130) is a specialist platform which is designed to facilitate support for emergency services dialling. In this capacity, the E-CSCF will take in requests from the P-CSCF (132) and S-CSCF (124) and route these emergency session requests to a suitable onward destination such as a PSAP (Public Safety Answering Point). Further, in general, the MGCF module 164 may be a SIP endpoint that can interface with security gateway (SGW) and may also control resources in media gateway (MGW) 166. The IBCF module 134 may enable boundary control between various service provider networks, thus providing CTAS enabled IMS network security in terms of signalling information. The IMS server may also include other existing components such as, for example, a component pertaining to Mobile Communications on board Aircraft (MCA) (160) that enables passengers to use their mobile phone on board an aircraft. A miniature cellular network is installed inside the aircraft. Mobile phones can connect to this network. Further, as shown in FIG. 1B, as the CTAS-IMS based implementation may be associated with another application server such as a Caller Ring Back Tone (CRBT)server (152) that allows the caller to hear subscriber pre-defined song or audio clip instead of standard ring tone until the subscriber picks up the call.

In an embodiment, CTAS (102) may be capable of handling VoLTE, M2M, Fixed-line (FLP) and Enterprise subscribers simultaneously. This makes CTAS a unique type of TAS which gives operational and engineering advantage to in managing the subscriber's growth in VoLTE, Fixed and Enterprise domain in most efficient way. In another embodiment, the CTAS (102) can be integrated with the NSN CSCFs for delivering MMTel Supplementary services to the VoLTE customers as well as to the customers who are using 4G Voice client over LTE or WiFi. The CTAS can support online and offline charging for subscribers. The CTAS (102) may further include IP Short Message Gateway (IPSMGW) that can handle SIP based messaging services for IMS subscribers. In addition, the IP-SM-GW will interact with the legacy SMSC (154) using MAP signalling in order to allow IMS to SMS conversion and distribution. The CTAS (102) may further include, but not limited to a service Centralization and Continuity Application Server (SCC AS). The SCC AS can acts as a back to back user agent within the IMS architecture and can facilitate service centralization, as well as coordination of Single Radio Voice Call Continuity (SR-VCC) handover procedures.

Figure 2A:
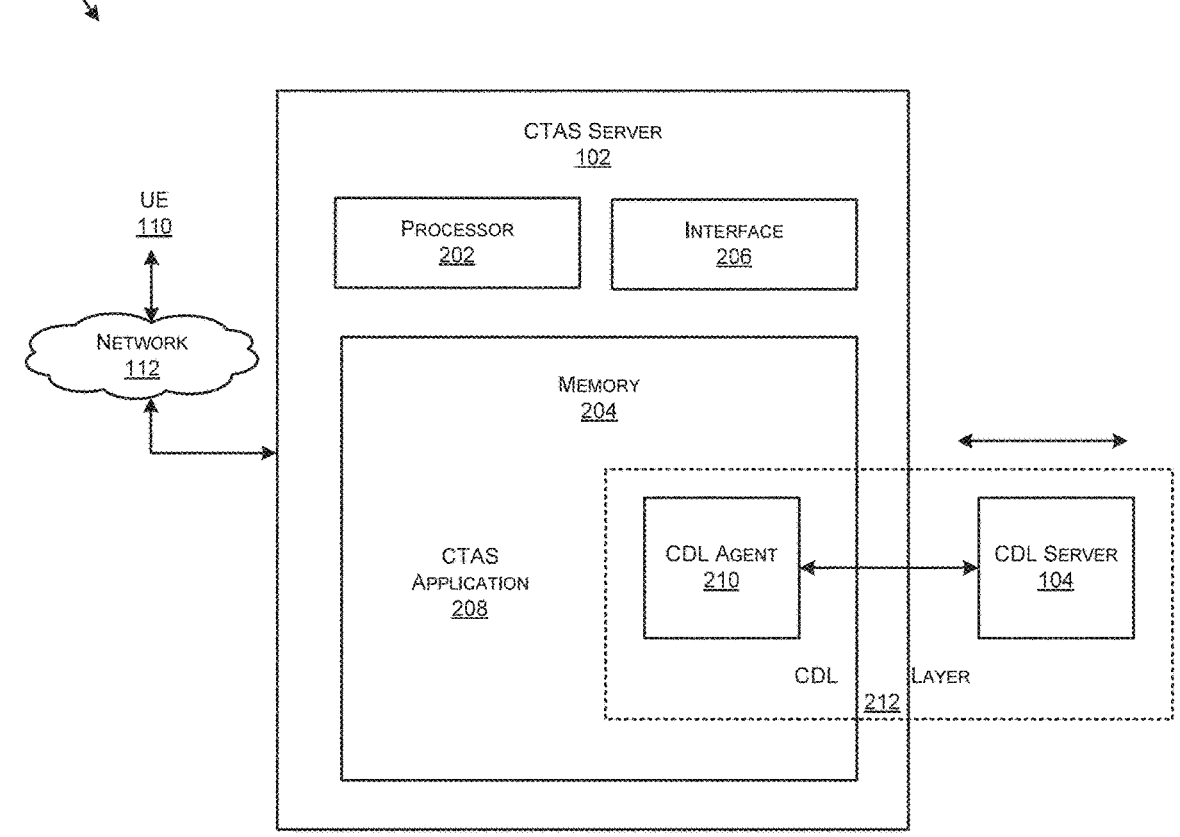

The system may facilitate routing of L1 numbers by a combination of hardware and software implementation. FIG. 2A with reference to FIG. 1A, illustrates an exemplary representation of a network device, in accordance with an embodiment of the present disclosure. The system includes the network device or CTAS 102 that may include one or more processors (202) (Ref. FIG. 2A). The network device or CTAS 102 may be integrated with IMS server 106 to provide a network service to a user device 110 (as shown in FIG. 1A) (interchangeably referred to as user equipment hereinafter). In an aspect, the network device 102 may include one or more processor(s) 202 coupled with a memory 204. The memory 204 may store instructions which when executed by the one or more processors may cause the system to perform the steps as described herein. The network device or CTAS 102 may cause the system to receive, through the IMS (106 of FIG. 1A), a request for routing a level 1 number in anticipation of at least one incoming communication from the UE (102).

In an example, the responsibility of handling of Level-1 (L1) numbers is upon the CTAS (102). Each circle has a predefined set of guidelines for handling Level-1 numbers. Alternatively, different states within the same circle may have a different set of guidelines.

In an example, one or more CTAS instances may be deployed in a super-Core of the network architecture. Each CTAS instance may be dedicated to handling traffic of a predefined circle. Further, a plurality of CTAS clusters may be used to serve traffic of a single circle and each circle may have its own CDL module. The level 1 number may be dialled by a user associated with the UE (110) from any location. The CTAS (102) may be configured to pre-form at least partially a communication strategy for a predefined list of numbers, in anticipation of at least one incoming communication from the UE with an L1 level number. The predefined list of numbers may include a set of level 1 numbers. In an example, the at least one incoming communication is selected from a group consisting of telephonic calls, web-based communications, voice-over-IP communications, and real-time text interactions and the like. Further, the at least partially pre-formed communication strategy may include any or a combination of routing strategy and a handling strategy determined based on the mapping table of the predefined list of numbers having routing information between an E-UTRAN Cell Identifier (ECI) and a short distance charging area (SDCA) of the predefined circle.

In an embodiment, the CTAS (102) may store the at least partially pre-formed communication strategy in the at least one centralized database such as the CDL server (104) but not limited to the like. When the CTAS (102) receives one or more predefined request signals from the UE, the CTAS (102) may determine if the one or more predefined request signals received is for an L1 level number for a predefined circle. For example, the one or more predefined request signals can be an INVITE request, and the CTAS will check whether the dialled number is a L1 number. The CTAS (102) may then generate, based at least in part on the at least partially pre-formed communication strategy associated with the UE and the determination of the L1 level number, a routing control signal for routing the UE communication to a target site or for supplying one or more corresponding handling strategies to the target site. For example, if a Mumbai user dials an L1 number such as 139 (Railway Helpline) or 181 (Woman in distress) or 1094 (Missing children and women), 1096 (Crime against women) and the user is in Mumbai itself, the CTAS will route these numbers to BSNL/MTNL exchanges in Mumbai SDCA.

In an embodiment, the one or more predefined request may indicate a requirement to establish the routing of L1 level numbers from the user device to the plurality of services associated with the L1 numbers at the pre-defined location. The system or CTAS 102 may enable identification of a pre-defined identification data of the user device at the pre-defined location. In an embodiment, the identification may be performed based on the pre-defined location of the user device and the predefined identification data may be selected from a group consisting of a phone number, an IP address, a device identifier, a user identifier, a cell identifier (cell-id), a pre-visited network id (PVNI), Pseudo Automatic Number Identification (PANI) and a program identifier.

The CTAS (102) may further process each L1 level number based on the identification data and a predefined set of configuration parameters. In an example, the predefined set of configuration parameters may include a set of requirements assigned to each L1 number by a network planning team for different PVNI.

In an embodiment, the CTAS (102) may allow routing information of a default circle to take precedence when predefined set of configuration parameters associated with a L1 level number is missing under the received predefined identification data.

In an embodiment, prior to routing of the one or more predefined request to the UE, the CTAS server may evaluate a pre-defined location of the UE associated with the pre-defined circle at the time of initiation of the one or more predefined request, wherein the predefined circle is either a home circle, a current visited circle or a roaming circle. The home circle may be associated with the user's home location, the current visited circle may be associated with a circle close to the user's home location that the user has visited and the roaming circle may pertain to a circle at a predefined distance from the user's home location.

Further, the at least partially pre-formed communication strategy associated with the UE may include checking by the CTAS, the PVNI and the PANI of the UE to ascertain a current visited circle of a user and cell-id to which the UE is currently latched into when the user is in roaming.

Further, the at least partially pre-formed communication strategy associated with the UE may also include rejecting an incoming call from a UE. Such rejection of the incoming call is performed if any or a combination of dialling of an L1 number is not allowed from the visited circle and the routing information for the PVNI of the UE is not present in the CTAS for the visited circle. For example, a call may be rejected by playing invalid number announcement and routing can be stopped at the CTAS, by configuring "IsRouting-ToBeStopped" flag as True. For example, if a user goes to a Mumbai circle and L1 number is not included in the Mumbai circle, routing information of the PVNI of the UE associated with user is not present and hence CTAS of that circle will stop or reject the call.

Additionally, the pre-formed communication strategy associated with the UE may include querying the centralized data layer (CDL) server (104) by the CTAS (102) to provide mapping of a SDCA against a Cell Global Identifier (cell-id) retrieved from a PANI header associated with a UE (110) making the L1 level number dialling. Further, the pre-formed communication strategy associated with the UE may include mapping of the cell-id with the SDCA for the predefined circle by the CDL (104). If the UE (110) is in roaming mode, the CDL may be further configured to query a centralised database having a knowledgebase associated with the predefined information data and routing details of calls made by the UE. The CDL is configured to determine the mapping details and then transmit the mapping details to the CTAS. Upon receiving the mapping details, the CTAS may convert the dialled Level-1 number to a predefined number format associated with the SCDA. For example, CTAS (102) can convert the dialled Level-1 number to a format: +91<SDCA><Level-1>.

Furthermore, the pre-formed communication strategy associated with the UE may include skipping of the query to the CDL server (104) by the CTAS if for an L1 number a predetermined routing is not required based on the PANI header. An outgoing request URI for a UE associated with the L1 number may be created based on a requirement configuration associated with an entity. For example, according to requirement, Trunk Group Identification (TGID) and Trunk Group parameter (TGRP) can be configured in a Special Number table in the CTAS (102). For VoWiFi calling, the CTAS may assume cell-id value to be "0" and the CDL will return SDCA value mapped against ECI "0".

In a way of example and not as a limitation, if the Mumbai user is dialling from Delhi, the identification data will contain location information of Delhi. The Mumbai CTAS will query to the centralise CDL of Mumbai, here centralised CDL mean circle level Centralised Data Layer application server. All the CTASs of Mumbai will interact with CDL application server of Mumbai for retrieving the location based routing information for a particular dialled L-1 number. This CDL server has the complete information mapping of PAN India Cell-Id/enodeB-ID and routing information in its persistent database.

In an embodiment, the current location of a user device is determined by its cell-ID (i.e. Cell Global Identifier) and in case of VOLTE, the count of PAN India Cell-ID is very high. A single enodeB has approximatively 8 cells or cell-IDs. Each cell ID consist of enodeB ID in it and hence user location can also be identified using enodeB-ID. So if we are able to get enodeB-ID from the cell-Id of the user device and maintain the location based routing information based on the enodeB-ID, then the data storage requirement may be reduced by ⅛. For data storage optimisation, CDL Application server has applied this logic and optimised the database storage requirement by 8th times. This algorithm also result in faster performance.

Furthermore, as per historical statistics CTAS (102) handles 90% of the calls originated by a home user device of a predefined circle and only 10% of the calls belong to one or more roaming user devices. Whereas in case of the CDL database, the location based routing data of the home circle is very less as compared to that of the roaming circles (i.e. 1 out of 23 circles). Therefore, 90% the traffic needs only the home circle location based routing data. Hence, in an embodiment, the CDL application server may cache the home circle location based routing data in its RAM after reading from the centralized database during application start-up. The system ensures that for the 90% of the call traffic, the CDL does not query the centralized database and for rest of the 10% call, the CDL server will get the location based routing data after querying the centralized database. Thus, the system is not only accurate but reduces communication delay and provides high capacity too. Moreover, the provisioning requirement for a CDL is less, there is careful utilization of resources in the network, the footprint also does not grow making the system extremely inexpensive but efficient.

In an example, the one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the system 102. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as RAM, or non-volatile memory such as EPROM, flash memory, and the like.

In an embodiment, the CTAS 102 may include an interface(s) 206. The interface(s) 206 may comprise a variety of interfaces, for example, interfaces for data input and output devices, referred to as I/O devices, storage devices, and the like. The interface(s) 206 may facilitate communication of the CTAS 102. The interface(s) 206 may also provide a communication pathway for one or more components of the system 110. Examples of such components include, but are not limited to, processing engine(s) or a CTAS application (208), a CDL agent (210) associated with a CDL server (104) though a CDL layer (212).

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 110 may comprise the machine-readable storage medium storing the instructions and the processing resource to execute the instructions, or the machine-readable storage medium may be separate but accessible to the system 110 and the processing resource. In other examples, the processing engine(s) 208 may be implemented by electronic circuitry.

The processing engine 208 may include one or more components (as shown in FIG. 2B) including session manager (SM) 214, operations and maintenance (OAM) manager 216, and a troubleshooting manager (TM) 218. The SM 214 may act as core functional delivery module which may be responsible for call processing and service chaining logic execution in case of CTAS. The tasks of handling SIP, HTTP and Diameter messages are of the SM 214. In case of the CDL (104), the session manager job can interact with a database and to provide necessary information sought by the CDL agent (210). The OAM manager 216 may be responsible for managing fault, configuration and performance aspects of the CTAS/network device. The OAM manager 216 may provide operations and maintenance touch point to the system or the CTAS 102. The OAM 216 may be integrated with EMS/OSS on a RESTful Interface. The TM 218 may aggregate logs and may debug information from all the functional managers for trouble shooting. The TM 218 may also provide flexibility to generate debug information, for example, in a Module wise, process wise, system wise manner. Various other functions of the components may be possible. In an embodiment, the database (not shown in FIG. 2B) may comprise data that may be either stored or generated as a result of functionalities implemented by any of the components of the processing engine(s) 208 of the system 110.

Figure 2C:
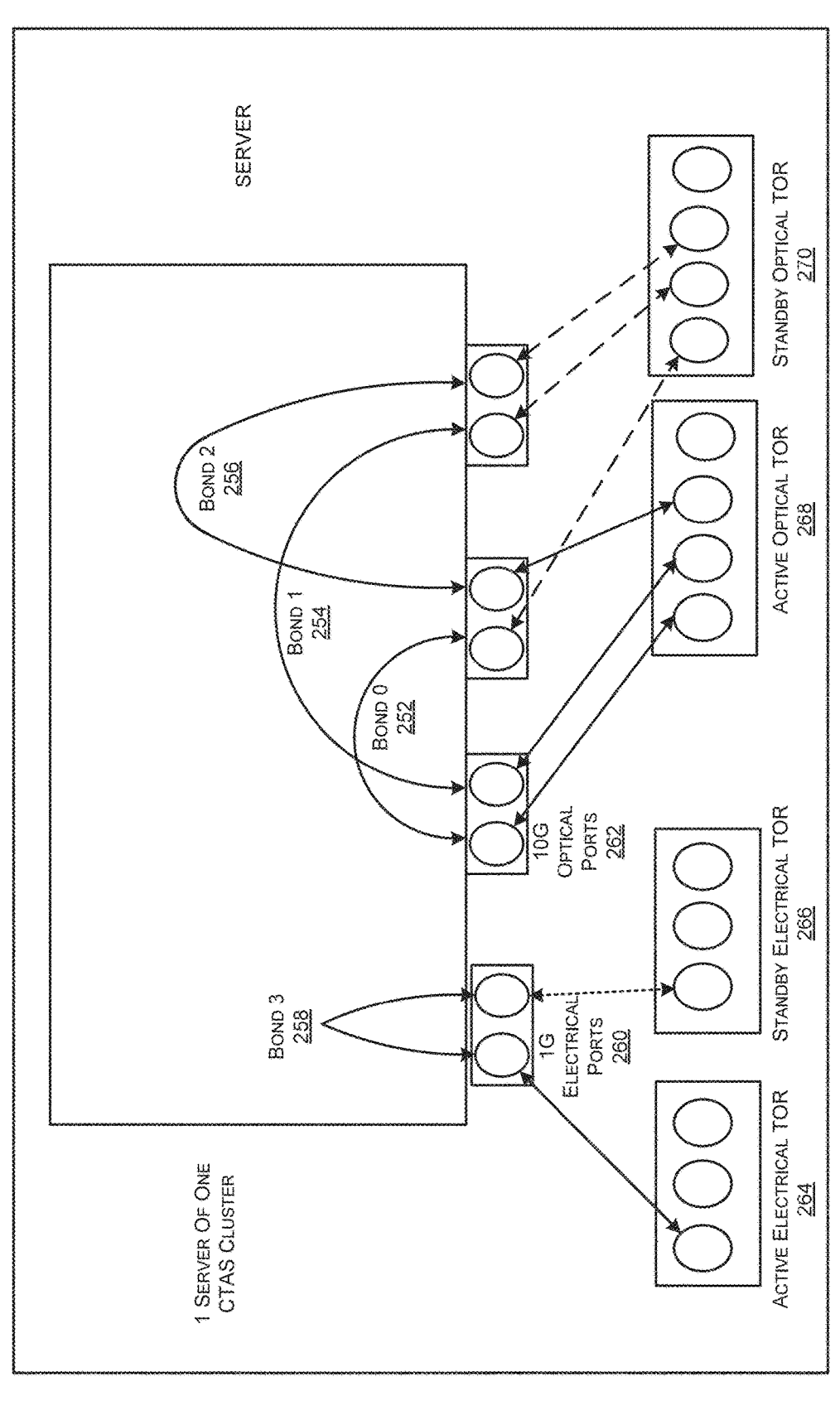
FIG. 2C illustrates an exemplary representation of a CTAS application module, in accordance with embodiments of the present disclosure.

FIG. 2C illustrates exemplary representation of a CTAS server, in accordance with embodiments of the present disclosure. As shown in FIG. 2C, the CTAS server is a cluster-based solution, and can be hosted on but not limited to predefined servers. Each server has at least four logical interfaces such as Bond0 (252), Bond1 (254), Bond2 (256) and Bond3 (258), where each Bond is a logically paired two ethernet ports to achieve link level redundancy. In an example, the Bond0 (252) interface may be used by at least eight blades for internal and database communication. The Bond1 (254) Interface can be used by SIP applications present in the at least eight servers for SIP signalling. The Bond2 (256) interface may be used for diameter communication by applications present in Blade3 onwards for example, from Blade3 to Blade8, whereas the Bond3 interface can be used communication with the Element Management System (EMS). In another example, for Bond0 (252), Bond1 (254) and Bond2 (256), 10G optical NIC cards (262) will be used, whereas for Bond3 (258), 1G electrical NIC cards (260) will be used.

The CTAS can support both IPv4 and IPv6 protocols, where the Bond2 (256) and the Bond3 (258) interfaces listen on either IPv6 or IPv4 at a given point of time and Bond1 interface listens on IPv4 and IPv6 at the same time. The Bond0 (252) interface, which is not used for any external communication supports only IPv4.

Figure 3:
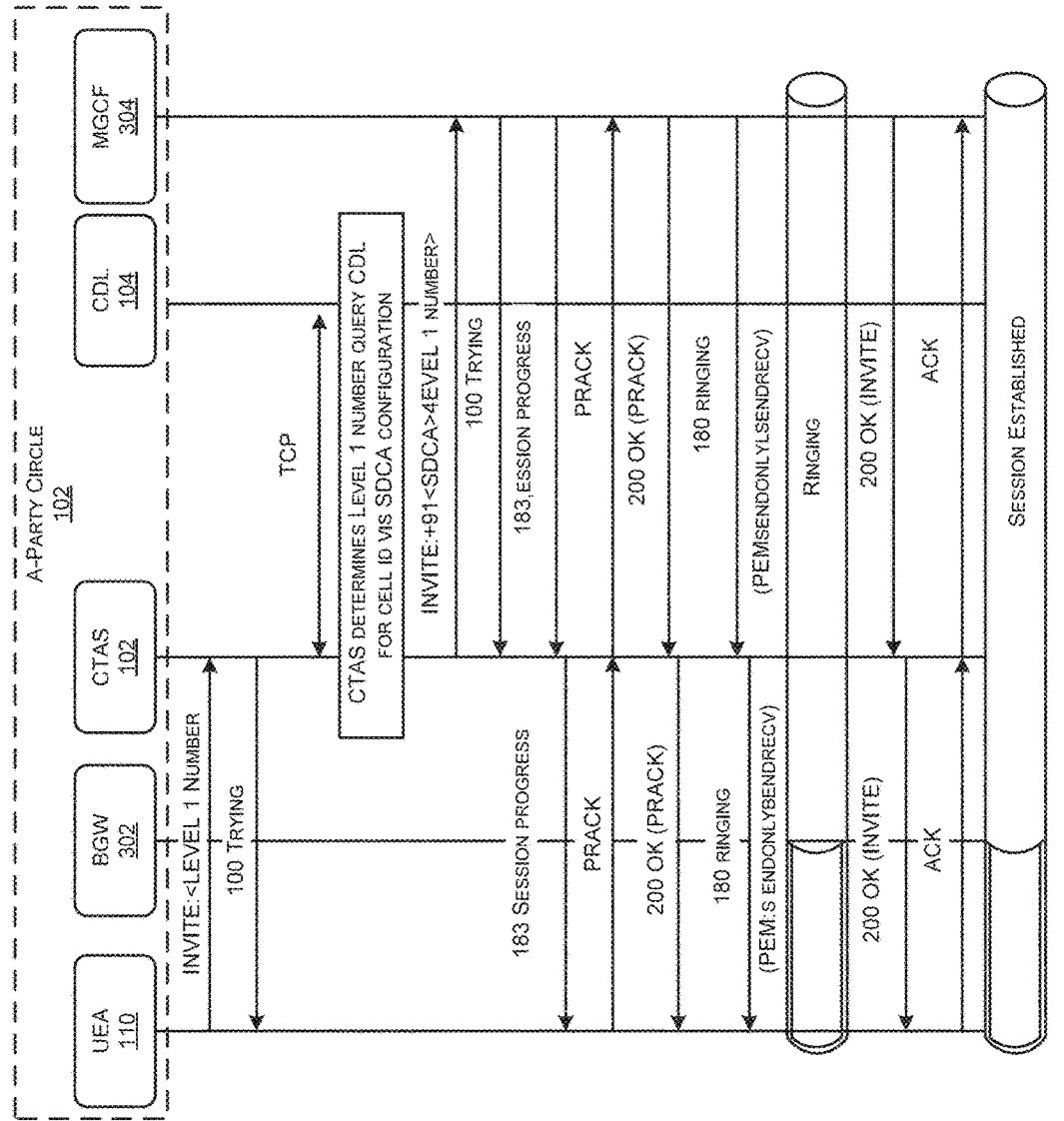
FIG. 3 illustrates an exemplary representation of flow diagram for facilitating a routing of L1 numbers, in accordance with an embodiment of the present disclosure.

FIG. 3 illustrates an exemplary representation for facilitating simultaneous communication of a user device with plurality of services, in accordance with an embodiment of the present disclosure. In this example, the user may be subscribed to a wireless service such as, for example Voice over Long-Term Evolution (VoLTE) service (using wireless user device) from a service provider, wherein network device associated with the service provider may enable to establish simultaneous communication of user device with plurality of services. As shown in FIG. 3, a solution is shown with respect to a user device at a pre-defined location such as a UE from circle A or UEA (110). Upon requirement, for example, in an emergency situation, the user may initiate a predefine request from the UEA (110) by sending an INVITE for a L1 number to a CTAS (102) through a border gateway (BGW) (302). The CTAS (102) may acknowledge the receipt of the predefined request INVITE after a wait time with a 100 Trying signal. The CTAS (102) then may determine the L1 number by sending a query to the CDL server (104) for cell-id verses SDCA configuration parameters. Upon determination of the L1 number by the CTAS (102), the INVITE request may be further sent to a management gateway control function (MGCF) (304).

As shown in FIG. 3, there may be a wait time with the 100 Trying signal between the MGCF (304) and the CTAS (102) after which a session is initiated between the MGCF (304) and the CTAS (102) with but not limited to a 183 session progress signal. The 183 session progress signal is extended to the UEA (110). The UEA (110) may not communicate directly with the MGCF (304) but through the CTAS (102) by sending a Packet received acknowledgement (PRACK) signal to the MGCF (304) via the CTAS (102). Another acknowledgement such as but not limited to 200 OK (PRACK) to the PRACK signal may be sent by the MGCF (304) to the CTAS (102) and the CTAS (102) further may forward the 200 OK (PRACK) to the UEA (110). As a result, a ringing tone such as 180 ringing signal may be established from the MGCF (304) to the UEA (110) via the CTAS (102) upon which the MGCF (304) may notify the CTAS (102) that the L1 number request has been acknowledged by a 200 OK (INVITE) signal and the CTAS (102) may further extend the notification to the UEA (110). The session is established as soon as the UEA (110) upon acknowledging the notification of the 200 OK (INVITE) signal to the MGCF (304) via the CTAS (102).

FIG. 4 illustrates an exemplary representation of flow diagram for facilitating a routing of L1 numbers, in accordance with an embodiment of the present disclosure.

As illustrated, in an aspect, the method (400) for routing and handling level 1 (L1) numbers may include at 402, a step of pre-forming by at least one converge telephony application server (CTAS), at least partially a communication strategy for a predefined list of numbers, in anticipation of at least one incoming communication from a UE with an L1 number. In an embodiment, the at least one incoming communication may be selected from a group consisting of telephonic calls, web-based communications, voice-over-IP communications, and real-time text interactions. Alternatively, at least the partially pre-formed communication strategy may include any or a combination of routing strategy and a handling strategy determined based on the mapping table comprising L1 number routing information between an E-UTRAN Cell Identifier (ECI) and a Short Distance Charging Area (SDCA) of the predefined circle. In an embodiment, the at least one CTAS may be associated with a predefined circle may access at least one centralised database that may maintain a mapping table comprising L1 routing information between the ECI and the SDCA of the predefined circle, and the routing strategy and handling strategy may occur through one or more communication interfaces for communicating with a plurality of UEs via one or more channels selected from a group consisting of: telephonic calls, web-based communications, voice-over-IP communications, and real-time text interactions. In an embodiment, the plurality of UEs may be associated with the predefined circle in a communication network.

The method (400) may also include a step of storing the at least partially pre-formed communication strategy in the at least centralized database. The method may further include at 404, the step of receiving one or more predefined request signals from the UE by the CTAS.

The method may include at 406, a step of determining, by the CTAS, upon receiving the one or more predefined request signals if the one or more predefined request signals received is for an L1 number.

Furthermore, the method may include at 408, a step of generating based on at least in part on the at least partially pre-formed communication strategy associated with the UE and the determination of the L1 level number, a routing control signal for routing the UE communication to a target site or for supplying one or more corresponding handling strategies to the target site by the CTAS.

The 3GPP specification used in routing the L1 numbers to the respective service is given in Table 1

| GSMA PRD IR.88 | LTE Roaming Guidelines |
|---|---|
| 3GPP TS 23.167 | IP Multimedia Subsystem (IMS) Emergency Sessions |

-continued

| IETF RFC 5031 | A Uniform Resource Name (URN) for Emergency and other Well-Known Services |
|---|---|
| IETF RFC 3261 | SIP: Session Initiation Protocol |
| GSMA PRD IR.88 | LTE Roaming Guidelines |
| GSMA PRD IR.58 | IMS Profile for Voice over HSPA |
| GSMA PRD IR.64 | IMS Service Centralization and Continuity Guidelines |
| GSMA PRD IR.65 | IMS Roaming and Interworking Guidelines |
| GSMA PRD IR.67 | DNS/ENUM Guidelines for Service Providers & GRX/IPX Providers |
| 3GPP TS 32.298 | Telecommunication management; Charging management; Charging Data Record (CDR) parameter description |
| 3GPP TS 32.260 | Telecommunication management; Charging management; IP Multimedia Subsystem (IMS) charging |

Figure 5:
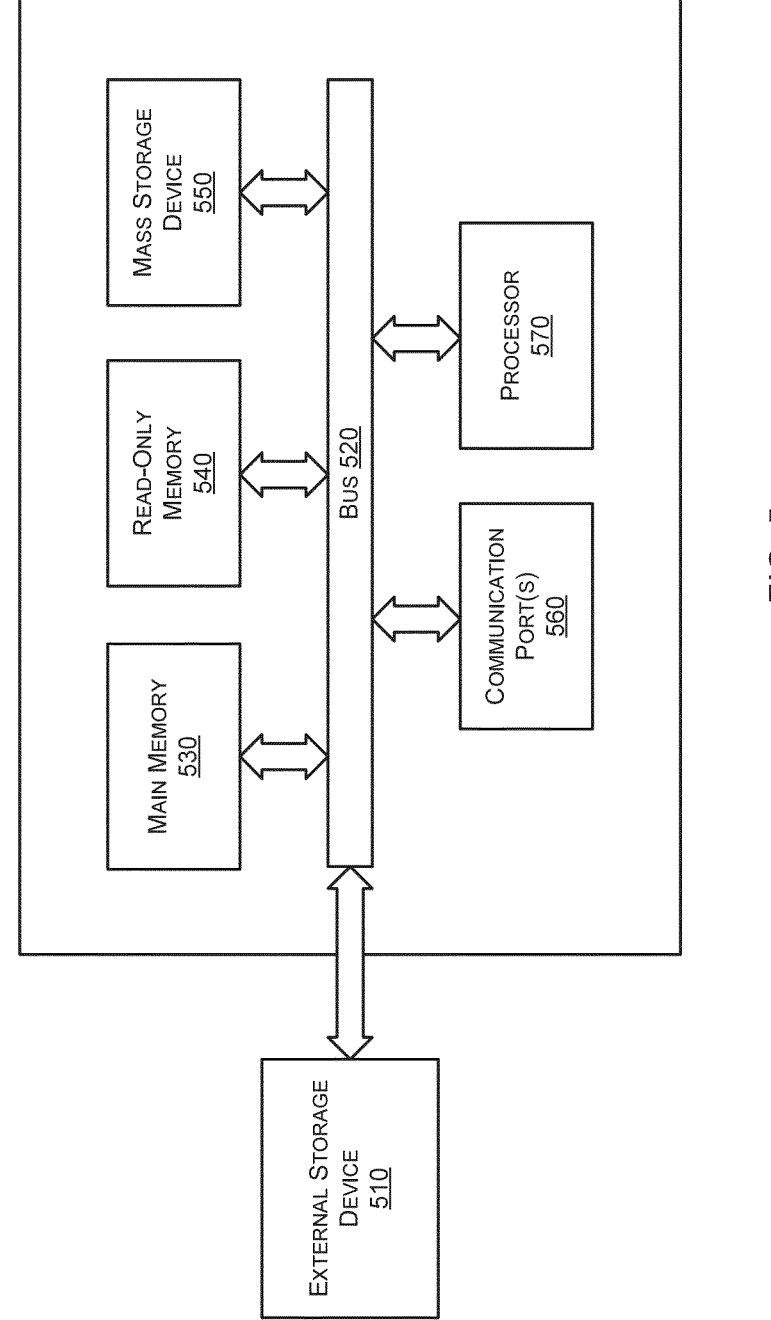
FIG. 5 illustrates an exemplary computer system in which or with which embodiments of the present invention can be utilized in accordance with embodiments of the present disclosure.

FIG. 5 illustrates an exemplary computer system in which or with which embodiments of the present invention can be utilized in accordance with embodiments of the present disclosure. As shown in FIG. 5, computer system 500 can include an external storage device 510, a bus 520, a main memory 530, a read only memory 540, a mass storage device 550, communication port 560, and a processor 570. A person skilled in the art will appreciate that the computer system may include more than one processor and communication ports. Processor 570 may include various modules associated with embodiments of the present invention. Communication port 560 can be any of an RS-232 port for use with a modem based dialup connection, a 10/100 Ethernet port, a Gigabit or 10 Gigabit port using copper or fibre, a serial port, a parallel port, or other existing or future ports. Communication port 560 may be chosen depending on a network, such a Local Area Network (LAN), Wide Area Network (WAN), or any network to which computer system connects. Memory 530 can be Random Access Memory (RAM), or any other dynamic storage device commonly known in the art. Read-only memory 540 can be any static storage device(s). Mass storage 550 may be any current or future mass storage solution, which can be used to store information and/or instructions.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with a computer system. Other operator and administrative interfaces can be provided through network connections connected through communication port 560. Components described above are meant only to exemplify various possibilities. In no way should the aforementioned exemplary computer system limit the scope of the present disclosure.

Thus, the present disclosure provides a technical solution for facilitating an effective and concurrent routing of L1 numbers irrespective of the location of the user. For example, the system and method can enable accurate routing of L1 numbers to the respective service whether the user is in his home location or is roaming. Further, the method and system of routing the L1 numbers optimizes the centralized database that stores routing information of a plurality of users. Several other advantages may be realized.

It would be appreciated that the embodiments herein are explained with respect to network device or CTAS, however, the proposed system and method can be implemented in any computing device or external devices without departing from the scope of the invention.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 23.167, 3GPP TS 32.298, 3GPP TS 32.260 and the like.

Advantages of the Present Disclosure

The present disclosure facilitates an effective, concurrent and improved communication system with a plurality of L1 numbers.

The present disclosure provides a system that eliminates the delays while getting access to a service while in roaming.

The present disclosure provides an economical and next generation based system and a method that can avoid the need for individually contacting each emergency service, thus avoiding unnecessary delay.

The present disclosure provides for a system and a method that can enable an instant communication with multiple L1 contacts irrespective of the location of the user.

The present disclosure provides for a system that facilitates optimized use of a centralised database associated with the network.

We claim:

1. A communication system (100) for routing and handling level 1 (L1) numbers, the system comprising:

at least one converge telephony application server (CTAS) (102) in communication with a user equipment (UE) (110) associated with a predefined circle in a communication network (112) and a centralized database, wherein the at least one CTAS (102) comprising a processor (202) that executes a set of executable instructions that are stored in a memory (204), upon execution of which, the processor (202) causes the at least one CTAS to:

pre-form at least partially a communication strategy for a predefined list of numbers, in anticipation of at least one incoming communication from a UE (110) with an L1 number, wherein the at least partially pre-formed communication strategy comprises any or a combination of routing strategy and a handling strategy determined based on the mapping table comprising L1 number routing information between an E-UTRAN Cell Identifier (ECI) and a Short Distance Charging Area (SDCA) of the predefined circle;

receive one or more predefined request signals from the UE (110);

determine upon receiving the one or more predefined request signals whether the one or more predefined request signals received is for an L1 number; and generate, based on the at least partially pre-formed communication strategy associated with the UE and the determination of whether the one or more predefined request signals received is for the L1 level number, a routing control signal for performing any or a combination of routing the UE communication to a target site and supplying one or more corresponding handling strategies to the target site.

2. The communication system as claimed in claim 1, wherein the at least one incoming communication is selected from a group consisting of telephonic calls, web-based communications, voice-over-IP communications, and real-time text interactions.

3. The communication system as claimed in claim 1, wherein the CTAS is configured to store the at least partially pre-formed communication strategy in the centralized database, wherein the centralised database accessible by the at least one CTAS (102), maintains a mapping table comprising L1 routing information between the (ECI) and the SDCA of the predefined circle.

4. The communication system as claimed in claim 1, wherein one or more communication interfaces for communicating with the plurality of UEs (110) via one or more channels selected from a group consisting of: telephonic calls, web-based communications, voice-over-IP communications, and real-time text interactions.

5. The communication system of claim 4, wherein the at least one CTAS (102) is further configured to:

treat each L1 number based on the pre-defined identification data and a predefined set of configuration parameters.

6. The communication system as claimed in claim 1, the one or more predefined request indicates a requirement to establish the routing of L1 level numbers from the UE (110) to the plurality of services associated with the L1 numbers at the pre-defined location, wherein the at least one CTAS (102) identifies a pre-defined identification data of the UE at the pre-defined location, wherein the at least one CTAS (102) identifies the pre-defined identification data of the UE (110) at the pre-defined location based on the pre-defined location of the UE (110) and the predefined identification data selected from a group consisting of a phone number, an IP address, a device identifier, a user identifier, a cell identifier (cell-id), a pre-visited network id (PVNI), Pseudo Automatic Number Identification (PANI) and a program identifier.

7. The communication system as claimed in claim 1, wherein the at least one CTAS (102) is further configured to:

allow routing information of a default circle to take precedence when configuration of a L1 number is missing under the predefined identification data.

8. The communication system as claimed in claim 7, wherein the CTAS (110) converts the dialed L1 number to a predefined number format associated with the SCDA.

9. The system as claimed in claim 1, wherein the one or more predefined request is initiated by a user associated with the UE (11) by dialling an L1 number using a dialling pad of the UE (110).

10. The communication system as claimed in claim 1, wherein prior to routing of the one or more predefined request to the UE (110), the CTAS (102) evaluates a predefined location of the UE (110) associated with the predefined circle at the time of initiation of the one or more predefined request, wherein the predefined circle is either a home circle, a current visited circle or a roaming circle.

11. The communication system as claimed in claim 1, wherein the at least partially pre-formed communication strategy associated with the UE (110) comprises checking by the CTAS, the PVNI and the PANI of the UE to ascertain a predefined location associated with a current visited circle of the user and a cell-id to which the UE (110) is currently latched into.

12. The communication system as claimed in claim 11, wherein the at least partially pre-formed communication strategy associated with the UE comprises rejecting an incoming call from a UE (110), if any or a combination of dialling of an L1 number is not allowed from a current visited circle and the routing information for the PVNI of the UE is not present in the CTAS (102) for the current visited circle.

13. The communication system as claimed in claim 12, wherein the at least partially pre-formed communication strategy associated with the UE (110) comprises querying a centralized data layer (CDL) server (104) by the CTAS (102) to provide mapping of a SDCA against a cell-id retrieved from a PANI header associated with a UE dialling a L1 number, wherein the centralized data layer (CDL) server (104) is operatively coupled to the centralized database.

14. The communication system as claimed in claim 13, wherein the at least partially pre-formed communication strategy associated with the UE (110) comprises mapping of the cell-id with the SDCA for the predefined circle by the CDL, wherein if the UE is in roaming mode in a roaming circle, the CDL is further configured to query the centralized database to determine the mapping details of the UE in the roaming circle and transmit the mapping details to the CTAS (102).

15. The communication system as claimed in claim 14, wherein the cell ID associated with the UE (110) comprises of an enodeB ID, wherein a location-based routing information of the UE can be maintained using the enodeB-ID to reduce a data storage requirement by at least ⅛.

16. The communication system as claimed in claim 14, wherein the CDL server (104) caches a home circle location-based routing data of the UE after reading from the centralized database during start-up, wherein the home circle location based routing data of the UE is cached in a storage unit operatively coupled to the CDL server (104).

17. The communication system as claimed in claim 13, wherein the CDL server (104) does not query the centralized database for the UE (110) that is in the home circle location, and wherein the CDL queries the centralized database for the UE (110) in the roaming circle.

18. The communication system of claim 11, wherein the at least partially pre-formed communication strategy associated with the UE comprises skipping of the query to the CDL server (104) by the CTAS (102) if for an L1 number a predetermined routing is not required based on the PANI header, wherein an outgoing uniform resource identifier (URI) for a UE (110) associated with the L1 number is created based on a requirement configuration associated with an entity.

19. A communication method for routing and handling level 1 (L1) numbers, the method comprising:

pre-forming by at least one converge telephony application server (CTAS) (102), at least partially a communication strategy for a predefined list of numbers, in anticipation of at least one incoming communication from a UE (110) with an L1 number, wherein the at least partially pre-formed communication strategy comprises any or a combination of routing strategy and a handling strategy determined based on the mapping table comprising L1 number routing information between an E-UTRAN Cell Identifier (ECI) and a Short Distance Charging Area (SDCA) of the predefined circle, wherein the at least one CTAS (102) is associated with a predefined circle accesses at least one centralised database, said centralized database maintaining a mapping table comprising L1 routing information between the ECI and the SDCA of the predefined circle, wherein the routing strategy and handling strategy occur through one or more communication interfaces for communicating with the via one or more channels selected from a group consisting of: telephonic calls, web-based communications, voice-over-IP communications, and real-time text interactions, and wherein the UE (110) is associated with the predefined circle in a communication network (112);

receiving, by the CTAS (102), one or more predefined request signals from the UE;

determining, by the CTAS (102), upon receiving the one or more predefined request signals if the one or more predefined request signals received is for an L1 number;

generating, by the CTAS (102), based at least in part on the at least partially pre-formed communication strategy associated with the UE (110) and the determination of the L1 level number, a routing control signal for performing any or a combination of routing the UE communication to a target site and supplying one or more corresponding handling strategies to the target site.

20. The method as claimed in claim 19, wherein the at least one incoming communication is selected from a group consisting of telephonic calls, web-based communications, voice-over-IP communications, and real-time text interactions.

21. The method as claimed in claim 19, wherein the method further comprises the step of storing by the CTAS, the at least partially pre-formed communication strategy in the centralized database, wherein the centralised database accessible by the at least one CTAS (102), maintains a mapping table comprising L1 routing information between the (ECI) and the SDCA of the predefined circle.

22. The method as claimed in claim 19, wherein the at least partially pre-formed communication strategy associated with the UE comprises checking by the CTAS (102), the PVNI and the PANI of the UE (110) to ascertain a current visited circle of a subscriber and cell-id to which the UE is currently latched into.

23. The method as claimed in claim 22, wherein the at least partially pre-formed communication strategy associated with the UE comprises rejecting an incoming call from a UE (110), if any or a combination of dialling of an L1 number is not allowed from the visited circle and the routing information for the PVNI of the UE (110) is not present in the CTAS (102) for the visited circle.

24. The method as claimed in claim 22, wherein the at least partially pre-formed communication strategy associated with the UE comprises querying a centralized data layer (CDL) server (104) by the CTAS (102) to provide mapping of a SDCA against a cell-id retrieved from a PANI header associated with a UE (110) dialling the L1 number.

25. A user equipment (UE) (108) communicatively coupled with at least one converge telephony application server (CTAS) (102), wherein the UE (108) is configured to:

initiate one or more predefined request signals in response to dialing of a Level 1 (L1) number; and send the one or more predefined request signals to the CTAS (102), wherein the CTAS (102), using a mapping table comprising L1 number routing information between an E-UTRAN Cell Identifier (ECI) and a Short Distance Charging Area (SDCA) of a predefined circle associated with the UE (108), determines whether the L1 number is associated with the UE (108) and generates a corresponding routing control signal.

26. A non-transitory computer readable medium comprising machine executable instructions that are executable by a processor to:

pre-form at least partially a communication strategy for a predefined list of numbers, in anticipation of at least one incoming communication from a UE (110) with an L1 number, wherein the at least partially pre-formed communication strategy comprises any or a combination of routing strategy and a handling strategy determined based on the mapping table comprising L1 number routing information between an E-UTRAN Cell Identifier (ECT) and a Short Distance Charging Area (SDCA) of the predefined circle;

receive one or more predefined request signals from the UE (110);

determine upon receiving the one or more predefined request signals whether the one or more predefined request signals received is for an L1 number; and generate, based on the at least partially pre-formed communication strategy associated with the UE and the determination of whether the one or more predefined request signals received is for the L1 level number, a routing control signal for performing any or a combination of routing the UE communication to a target site and supplying one or more corresponding handling strategies to the target site.

* * * * *